(12) United States Patent
Bourges et al.

(10) Patent No.: US 11,560,910 B2
(45) Date of Patent: Jan. 24, 2023

(54) FASTENER USING LUBRICATED INTERFERENCE FIT

(71) Applicant: LISI Aerospace, Paris (FR)

(72) Inventors: Laurent Bourges, Rancho Palos Verdes, CA (US); Johan Stephan, Houilles (FR); Christophe Van Daele, Conflans Sainte Honorine (FR)

(73) Assignee: LISI AEROSPACE, Paris (FR)

( * ) Notice: Subject to any disclaimer, the term of this patent is extended or adjusted under 35 U.S.C. 154(b) by 559 days.

(21) Appl. No.: 16/742,274

(22) Filed: Jan. 14, 2020

(65) Prior Publication Data

US 2020/0149566 A1    May 14, 2020

Related U.S. Application Data

(62) Division of application No. 15/515,593, filed as application No. PCT/EP2015/072468 on Sep. 29, 2015, now Pat. No. 10,544,815.

(30) Foreign Application Priority Data

Sep. 30, 2014    (FR) ....................... 1459269

(51) Int. Cl.
*F16B 4/00* (2006.01)
*F16B 5/02* (2006.01)
(Continued)

(52) U.S. Cl.
CPC ............ *F16B 4/004* (2013.01); *B05D 3/0493* (2013.01); *B64D 45/02* (2013.01); *C09D 5/00* (2013.01);
(Continued)

(58) Field of Classification Search
CPC ...... C10M 2205/0245; C10M 2207/04; C10M 2213/02; C10M 107/04; C10M 107/06;
(Continued)

(56) References Cited

U.S. PATENT DOCUMENTS 3,034,611 A    5/1962   Zenzic
3,047,036 A    7/1962   Waltermire
(Continued)

FOREIGN PATENT DOCUMENTS

DE    20 2010 007769 U1    8/2010
EP           2406336           5/2013
(Continued)

OTHER PUBLICATIONS

Schandel, Yannick, International Search Report for PCT/EP2015/072468, dated Dec. 4, 2015, 3 pages, ISA/European Patent Office.
(Continued)

*Primary Examiner* — Kevin R Kruer
(74) *Attorney, Agent, or Firm* — Henricks Slavin LLP

(57) ABSTRACT

The invention relates to a method for installing metallic fastener (10; 40) for the interference fit assembly of at least two structural elements (20, 22) comprising a through hole, the fastener comprising an enlarged head (12; 42), a shaft (14; 44) having an external diameter before installation that is greater than an internal diameter of the hole, said shaft comprising a conductive surface (26; 56). Before installation, at least the conductive surface (26; 56) is coated with a lubricating layer (30), which comprises a mixture of at least one polyolefin and one polytetrafluoroethylene, for example, having sufficient adherence to prevent its abrasion by manual manipulation of the fastener and being weak enough to be at least partly stripped from the conductive surface during the interference fit assembly of the fastener. The invention is applicable to the assembly of aircraft structures.

12 Claims, 3 Drawing Sheets

(51) Int. Cl.
| | |
|---|---|
| *F16B 33/00* | (2006.01) |
| *F16B 33/06* | (2006.01) |
| *B64D 45/02* | (2006.01) |
| *C09D 123/02* | (2006.01) |
| *B05D 3/04* | (2006.01) |
| *C09D 5/00* | (2006.01) |
| *C09D 5/14* | (2006.01) |
| *C09D 123/06* | (2006.01) |
| *C09D 123/12* | (2006.01) |
| *C10M 107/04* | (2006.01) |
| *C10M 107/06* | (2006.01) |
| *C10M 125/26* | (2006.01) |
| *C10M 129/16* | (2006.01) |
| *C10M 147/02* | (2006.01) |
| *C23C 26/00* | (2006.01) |
| *F16B 1/00* | (2006.01) |
| *C10N 30/16* | (2006.01) |

(52) U.S. Cl.
CPC ............. *C09D 5/14* (2013.01); *C09D 123/02* (2013.01); *C09D 123/06* (2013.01); *C09D 123/12* (2013.01); *C10M 107/04* (2013.01); *C10M 107/06* (2013.01); *C10M 125/26* (2013.01); *C10M 129/16* (2013.01); *C10M 147/02* (2013.01); *C23C 26/00* (2013.01); *F16B 5/02* (2013.01); *F16B 33/008* (2013.01); *F16B 33/06* (2013.01); *C10M 2201/105* (2013.01); *C10M 2205/0225* (2013.01); *C10M 2205/0245* (2013.01); *C10M 2207/04* (2013.01); *C10M 2213/02* (2013.01); *C10N 2030/16* (2013.01); *F16B 2001/0064* (2013.01)

(58) Field of Classification Search
CPC ............. C10M 125/26; C10M 129/16; C10M 147/02; C10M 2201/105; C10M 2205/0225; C10N 2030/16; C09D 5/00; C09D 5/14; C09D 123/02; C09D 123/06; C09D 123/12; F16B 5/02; F16B 33/008; F16B 33/06; F16B 4/004
See application file for complete search history.

(56) References Cited

U.S. PATENT DOCUMENTS

| | | | |
|---|---|---|---|
| 3,065,108 A | 11/1962 | Seelig | |
| 3,069,387 A | 12/1962 | Allen | |
| 3,346,469 A | 10/1967 | Weigel | |
| 3,418,012 A | 12/1968 | La Torre | |
| 3,962,775 A | 6/1976 | King, Jr. | |
| 3,979,351 A | 9/1976 | Sekhon | |
| 4,164,971 A | 8/1979 | Strand | |
| 4,197,380 A * | 4/1980 | Chao | C09J 7/35 525/200 |
| 4,230,016 A | 10/1980 | Merrell | |
| 4,326,825 A | 4/1982 | Volkmann | |
| 4,423,192 A * | 12/1983 | Van Lang | C08J 9/10 264/211 |
| 4,609,315 A | 9/1986 | Briles | |
| 4,758,627 A * | 7/1988 | Wilkus | C08L 23/0815 525/193 |
| 4,787,991 A * | 11/1988 | Morozumi | C08L 101/00 508/202 |
| 4,813,834 A | 3/1989 | Smith | |
| 4,829,116 A * | 5/1989 | Piesold | C08L 23/0815 524/278 |
| 5,006,292 A * | 4/1991 | Shii | H01B 3/445 264/211.21 |
| 5,466,743 A * | 11/1995 | Schamesberger | A63C 5/044 524/545 |
| 5,753,316 A * | 5/1998 | Brent | C09D 5/08 427/388.1 |
| 6,025,441 A * | 2/2000 | Koshirai | C08L 23/12 521/149 |
| 7,695,226 B2 | 4/2010 | March | |
| 8,361,565 B2 | 1/2013 | Kuhlenschmidt | |
| 8,382,413 B2 | 2/2013 | Nguyen et al. | |
| 8,475,102 B2 | 7/2013 | Haylock | |
| 10,358,515 B2 * | 7/2019 | Okanishi | C08F 214/262 |
| 10,544,815 B2 | 1/2020 | Bourges et al. | |
| 2005/0143508 A1 * | 6/2005 | Tyagi | C08L 27/18 524/451 |
| 2005/0151120 A1 | 7/2005 | Philipson | |
| 2005/0197460 A1 * | 9/2005 | Patel | C08L 27/12 525/192 |
| 2010/0201119 A1 * | 8/2010 | Bordet | F16L 58/182 285/94 |
| 2011/0045309 A1 * | 2/2011 | Reusmann | C10M 169/044 428/457 |
| 2011/0165331 A1 | 7/2011 | Barth | |
| 2011/0272860 A1 * | 11/2011 | Walia | C08L 23/10 524/451 |
| 2011/0285124 A1 * | 11/2011 | Pinel | C10M 105/34 285/94 |
| 2014/0219744 A1 * | 8/2014 | Heeter | H01R 43/16 411/368 |
| 2016/0375915 A1 * | 12/2016 | McGuire | F16C 29/02 105/218.1 |

FOREIGN PATENT DOCUMENTS

| | | | |
|---|---|---|---|
| FR | 2946707 | 12/2010 | |
| GB | 2 212 580 A | 7/1989 | |
| WO | WO-9846687 A1 * | 10/1998 | ......... C10M 103/04 |
| WO | WO 2009/112238 A1 | 9/2009 | |
| WO | WO 2011/050040 | 4/2011 | |

OTHER PUBLICATIONS

Dow Corning, Molykote D-708 Anti-Friction Coating, Jun. 18, 2004, 2 pages, Ref. No. 80-3210a-01.

* cited by examiner

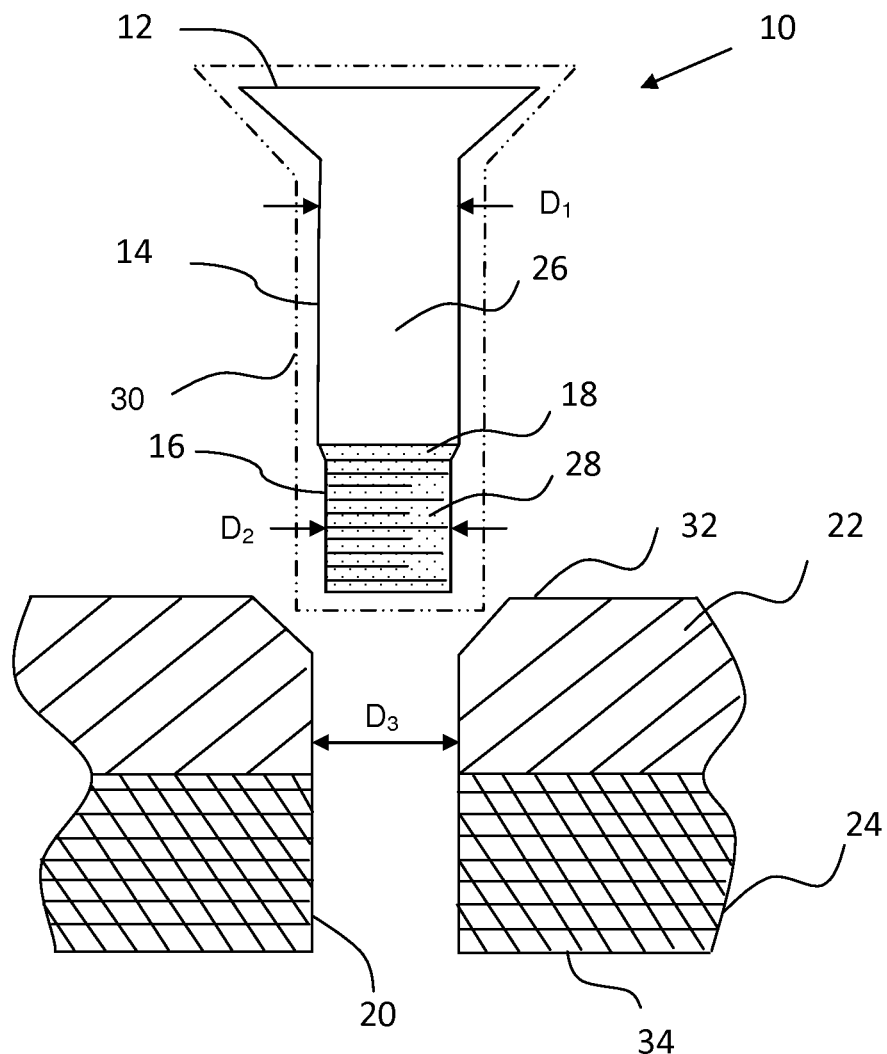
FIG. 1
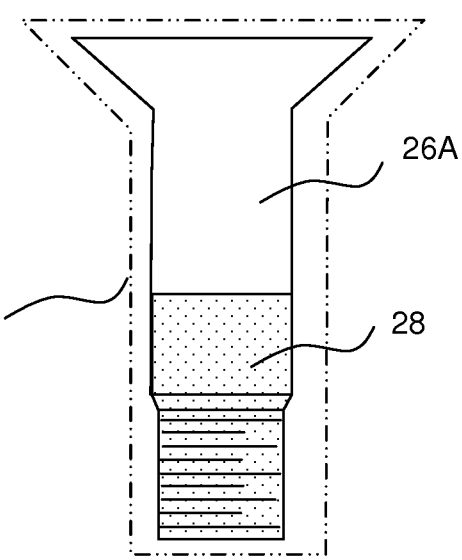
FIG. 2
FIG. 3

FASTENER USING LUBRICATED INTERFERENCE FIT

CROSS REFERENCE TO RELATED APPLICATIONS

This is a division of U.S. application Ser. No. 15/515,593 filed Mar. 29, 2017, now U.S. Pat. No. 10,544,815, issued Jan. 28, 2020, which is a Section 371 of PCT/EP2015/072468, filed Sep. 29, 2015, which claims priority to France Application Number 14 59269, filed Sep. 30, 2014, the entire contents of all of which are incorporated herein by reference.

The present invention relates to an electricity conductive fastener for apparatus of the aircraft type, to a method for obtaining such a fastener and to a method for installing such a fastener in an assembly of structural elements.

The new generation of airplanes comprise structures made of carbon fiber-reinforced composite material that have the advantage of significantly reducing the weight of the airplane and which, contrary to metallic materials, are not subject to corrosion and to the fatigue phenomenon. However, contrary to a metallic structure, these composite materials are poor electric conductors. They raise problems with respect to discharging currents and, consequently, to resistance to lightning strikes. Therefore, any clearance that could exist between a fastener and a hole in which the fastener is installed needs to be removed so as to create a close contact between the fastener and the structure. This contact facilitates the passage of the current, prevents the creation of sparks and prevents the presence of a volume of air, which, upon the passage of strong currents, converts into a pressurized plasma that is susceptible to ignite fuel in the event that a fastener is installed in a tank structure. For this reason, the interference fit installation of sleeved fastener devices has become widespread over recent years in the field of structures made of composite materials, in order to allow the strong electric currents generated by lightning to be discharged.

Sleeved fasteners are thus known from the prior art, from documents U.S. Pat. No. 8,382,413 and WO 2011/050040, that have a partial coating. These fasteners comprise a screw and a bushing installed with clearance in a hole. The bushing radially dilates in the structure when the shaft of the screw is inserted into the bushing, the shaft having an external diameter that is greater than the internal diameter of the bushing. To allow the shafts of the screws to be inserted, these shafts comprise either a lubricating varnish containing a pigment such as molybdenum disulfide ($MoS_2$) or an organic coating containing aluminum pigments and lubricating pigments on an annular portion of their external surface. Both are reasonably considered to be electrically isolating due to the presence of organic dielectric resin. The screws further comprise a bare, electricity conductive annular shaft portion. The bushing is left bare to allow the electric currents to pass from the screw to the composite structure.

The method for applying a partial lubricating coating on the shaft involves complex operations of masking screw portions per unit and does not allow bulk industrial treatment of large volumes of fasteners. Furthermore, the use of sleeved fastening systems is costly and increases the weight of the airplane.

Threaded metallic fasteners are also known that are intended to be inserted directly into a non-sleeved structure by an interference fit. These fasteners can be treated in various ways: the fastener material is either left bare after a passivation operation or is coated with pure aluminum using the method called "IVD" or is coated with an anticorrosion coating that is phenol-formaldehyde resin-based comprising aluminum pigments of the HI-KOTE™ 1 or HI-KOTE™ 1NC type marketed by HI-SHEAR Corporation, which is disclosed in the U.S. Pat. No. 3,979,351 and EP 2406336, or is anodized in sulfuric acid or is coated with cadmium. The fasteners are all lubricated by a final layer of cetyl alcohol, which is a lubricating grease, in order to allow a nut to be assembled on the threaded portion. The cetyl alcohol is easily removed during a manual manipulation, vibrations during transportation or in automated fitting systems or even during cleaning operations using a cloth.

Aluminum exhibits very good electric conductivity and reduces the friction in the threads. Nevertheless, its lubricating power is too weak to allow a fastener to be installed in a structure by interference fit. Indeed, an aluminum coated screw, even if it is coated with cetyl alcohol, seizes very quickly when it is installed in a structure or a bushing with an internal diameter that is less than the diameter of the screw and may not be fully installed, especially when the thickness of the structure to be tightened is significant.

The aluminum pigment coating protects touching parts from galvanic corrosion and prevents any seizing between the thread of the screw and the tapping of a nut when screwing on said nut. It is not considered to be an electricity conductor.

Sulfuric anodization is conventionally carried out on aluminum, titanium or aluminum or titanium alloy parts in order to increase the corrosion resistance of the part. The layer has no lubricating power and is conductive when it is less than one micron thick.

None of these fastener variants can be mounted by interference fit in an area of the airplane that is likely to be struck by lightning, either due to insufficient lubrication of the shaft or due to excessive electrical resistance of the anticorrosion coating compromising the passage of the lightning currents.

An object of the invention is to overcome these problems. Therefore, the object of the invention is a metallic fastener for the interference fit assembly of at least two structural elements comprising a through hole, the fastener comprising an enlarged head, a shaft having an external diameter before installation that is greater than an internal diameter of the hole, said shaft comprising a conductive surface. Before installation, at least the conductive surface is coated with a lubricating layer, the composition of which comprises a mixture of at least one polyolefin and one polytetrafluoroethylene, comprising at least 80% by weight of polyolefin and polytetrafluoroethylene, which is determined so as to have sufficient adherence to prevent its abrasion by manual manipulation of the fastener and to be weak enough to be at least partly stripped from the conductive surface during the interference fit assembly of the fastener.

The lubricating layer has high lubricating power and low adherence on the external surface of the shaft, yet which is sufficient so as not to be removed by simple manual manipulation. When the metallic fastener is inserted into the structure by interference fit, this layer is progressively and partly stripped from the shaft, leaving part of the external metallic surface of the shaft in contact with the structure, allowing the electric currents coming from the lightning to propagate in the structure.

Of course, the invention is applicable to the assembly of mixed structures, i.e. using composite and metallic materials, and to the assembly of purely metallic structures.

The fastener according to the invention can further comprise at least one of the following features, taken individually or in combination:
- the polyolefin is a polyethylene or a polypropylene;
- the lubricating layer further comprises a desiccant and a biocide;
- the conductive surface comprises a sulfuric anodization layer that is less than 1 micron thick;
- the conductive surface is a metal having undergone a passivation operation;
- the conductive surface is an aluminum layer deposited in a vacuum;
- the conductive surface comprises the entire external surface of the shaft;
- the conductive surface comprises one portion of the external surface of the shaft;
- the conductive surface comprises an annular portion of the shaft of the fastener;
- the conductive surface comprises an axial portion of the shaft of the fastener;
- the lubricating layer further coats a threaded portion of the fastener;
- the fastener further comprises a traction tail and a shear groove designed to break under a certain tensile stress The invention further relates to a method for obtaining a metallic fastener for the interference fit assembly of at least two structural elements comprising a through hole, the method comprising the steps of:
- supplying a metallic fastener comprising an enlarged head, a shaft having an external diameter before installation that is greater than an internal diameter of the hole, said shaft comprising a conductive surface;
- spraying or soaking at least part of the fastener with/in an alkaline solution comprising 60% to 80% by weight of an aqueous-based solvent and 20% to 35% of a mixture of at least one polyolefin and one polytetrafluoroethylene;
- drying the fastener in order to obtain a dry, lubricating polymer layer comprising a mixture of at least one polyolefin and one polytetrafluoroethylene.

The method for manufacturing a fastener according to the invention can further comprise at least one of the following features, taken individually or in combination:
- the drying is carried out at a temperature between 60° C. and 80° C.;
- a step of centrifugation is carried out after soaking and before drying;
- the step of spraying or soaking is preceded by a step of depositing an aluminum layer or a step of sulfuric anodization.

The invention further relates to a method for installing a metallic fastener through a hole passing through at least two structural elements, the fastener comprising an enlarged head, a shaft having an external diameter before installation that is greater than an internal diameter of the hole, said shaft comprising a conductive surface. Before installation, at least the conductive surface is coated with a layer of lubricating polymers comprising a mixture of at least one polyolefin and one polytetrafluoroethylene. During the installation, during a step of inserting the shaft of the screw into the structure through an interference fit, the lubricating layer is partly stripped from the shaft of the screw.

The invention further relates to the use of at least one metallic fastener according to one embodiment of the invention, through a hole passing through at least two structural elements of an aircraft, in order to dissipate electric currents in at least one structural element when at least the head of the fastener is struck by lightning.

The invention and its various applications will be better understood upon reading the following description and with reference to the accompanying drawings, which are provided solely by way of a non-limiting example of the invention and in which:

FIG. 1 shows a fastener according to a first embodiment, before installation in a structure shown as a section view;

FIG. 2 shows a fastener according to a second embodiment of the invention;

FIG. 3 shows a fastener according to a third embodiment of the invention;

Throughout these figures, identical elements use the same reference numerals.

Figure 4:
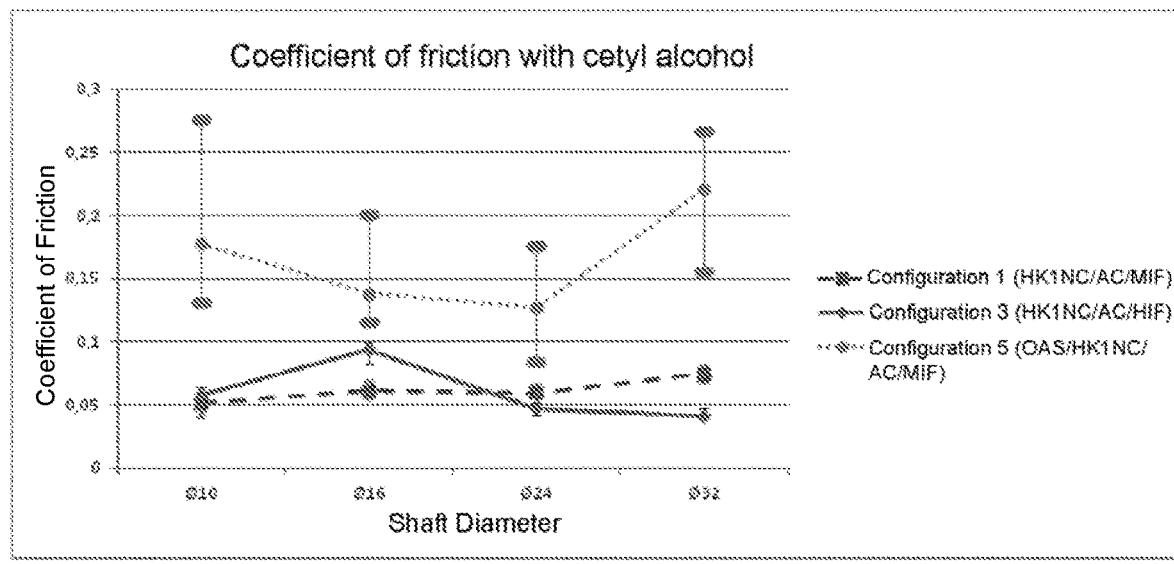
FIG. 4 shows the evolution of the friction coefficient of fasteners of the prior art with various diameters, coated with cetyl alcohol.

FIG. 1 schematically shows a side view of a fastener 10 before installation in a hole 20 made in structural elements 22, 24, which are shown as section views. Preferably, at least one structure is made of a composite material, in this case the structure 24.

The metallic fastener 10 comprises a countersunk head 12, a cylindrical shaft 14 having an external diameter $D_1$ and a blocking portion 16 in the form of a thread having an external diameter $D_2$ that is measured at the crest of the thread, with $D_2$ being less than $D_1$. A transition portion 18 connects the cylindrical shaft 14 to the threaded portion 16. The diameter $D_3$ of the hole 20 before installation of the fastener 10 is less than the external diameter $D_1$ of the shaft 14 and is greater than the diameter $D_2$ of the threaded portion, so that the threads are not damaged when the fastener 10 is introduced into the hole 20.

In the example that is shown, the fastener 10 is a titanium alloy that has undergone sulfuric anodization, creating an anodization layer that is less than one micron thick over the entire external surface of the fastener. The external surface 28 of the threaded portion 16 and of the transition portion 18 is coated with a second layer of lubricating anticorrosion coating containing aluminum pigments of the HI-KOTE™ 1NC type. This surface 28 is thus isolating (it is shown with a dotted background in FIGS. 1 to 3 and 6). The surface 26 of the head 12 and of the shaft 14 is electrically conductive.

In the example of FIG. 1, the entire surface of the shaft 14 is conductive. However, only an annular portion (26A) of the shaft (FIG. 2) or one or more axial portions (26B) over the entire height of the shaft or over only part of the height of the shaft (FIG. 3) can be conductive. The other portions thus can be coated with a lubricating anticorrosion coating containing aluminum pigments.

In the examples of FIGS. 1 to 3 and 6, the fastener 10 is completely coated with a lubricating layer 30, shown by a dot-and-dash line in the figures. The thickness of the lubricating layer 30 can vary from 5 to 25 microns, without this thickness affecting the mechanical performance or the electric conduction of the fastener.

The applicant has surprisingly noted that such a screw 10 can be installed into a structure by interference fit and is able to conduct the electric currents when at least the external surface of the shaft is coated with a lubricating layer 30 comprising a mixture of polyolefin(s) and polytetrafluoroethylene. The applicant has also noted that applying this same layer 30 on the lubricating anticorrosion coating of the threaded portion significantly reduced the dispersion of the torque needed to install the fastener compared to the dispersion generated through the use of cetyl alcohol. Furthermore, the lubricating power of this lubricating layer 30 is highly homogenous, regardless of the substrate on which it is applied.

The applicant thus has tested the interference fit installation of two batches of fasteners 10 with different external diameters (diameters measured in $16^{th}$ of an inch), coated with different thicknesses of a lubricating layer 30. The configurations tested and shown in table 1 are as follows:

Configuration 1: application of the lubricating layer 30 by soaking and centrifugation;

Configuration 2: manual application of the lubricating layer 30 in one, one second spray gun pass;

Configuration 3: manual application of the lubricating layer 30 in one, 15 second spray gun pass.

The interference fit is measured by comparing the diameter $D_3$ of a hole made in an aluminum sample simulating a structure to the external diameter $D_1$ of the shaft 14 of the fastener 10 before installation. The thickness of the lubricating layer 30 is measured before the fastener 10 is inserted. The fastener 10 is installed in the hole by pushing on the head 12, with the installation force being measured until the head touches the sample. The sample is then cut in order to withdraw the fastener 10 without damaging the surface of the shaft 14, and the thickness of the lubricating layer 30 that remains after installation is measured. The average values of the results of these measurements are shown in table 1.

TABLE 1

| | | Layer 30 thickness before installation (µm) | Layer 30 thickness after installation (µm) | Interference (mm) | Installation force (N) |
|---|---|---|---|---|---|
| Diam. 4 | Conf. 1 | 7.7 | 1.6 | 0.070 | 6 107 |
| | Conf. 2 | 8.3 | 1.7 | 0.068 | 6 730 |
| | Conf. 3 | 23.5 | 2.1 | 0.099 | 6 099 |
| Diam. 10 | Conf. 1 | 8.3 | 0.9 | 0.065 | 10 241 |
| | Conf. 2 | 9.8 | 1.0 | 0.067 | 11 294 |
| | Conf. 3 | 22.8 | 1.0 | 0.098 | 10 960 |

In all cases, the fasteners 10 were inserted by interference fit until the heads 12 came into contact with the surface of the test samples with a moderate installation force. Depending on the configurations, stripping of the lubricating layer 30 is observed, with the surplus remaining contained under the head or being pushed outwards. The thickness of the lubricating layer 30 after insertion is highly homogenous and is between 0.9 and 2.1 µm.

A plurality of fasteners 10 installed by interference fit in samples made of a carbon fiber composite underwent lightning tests to verify their electrical conductivity. In order to complete these tests, the samples comprising the fasteners are installed in a darkroom. Some heads 12 of fasteners are struck by an extremely high amplitude current that is equivalent to that of lightning. A camera records the test in order to detect sparking or degassing around the fasteners 10. The samples are then removed from the room and are cut in order to visually examine the surface of the fasteners 10 with a scanning electron microscope.

The completed tests show that no sparking or degassing occurred during the test. The visual analyses show that no shaft 14 was damaged by the lightning, but that portions of the lubricating layer 30 and of the anodization layer were removed during the insertion. One theory is that the roughness of the carbon fibers in the composite material has an abrasive effect on a portion of the surface of the shaft, but that this effect does not continue over the entire height of the shaft.

According to one variant of the invention, the conductive surface 26 can be made up of the bare or passivated surface of the metal forming the fastener or by an aluminum layer deposited in a vacuum on the bare surface of the metal forming the fastener.

Indeed, the applicant has surprisingly noted that the lubricating power of the lubricating layer 30 did not depend on the support on which it was applied. Therefore, the applicant has undertaken several insertion tests of fasteners 40 comprising a traction tail 50 (FIG. 6) with four different diameters, comprising various substrates coated either with cetyl alcohol or with a lubricating layer 30. The insertion was carried out with an interference fit using a traction machine pulling the traction tail and measuring the installation forces. A computation allows the friction coefficients to be determined between the fastener 40 and the structure in which the fastener is inserted.

The tested configurations are as follows:

configuration 1 (HK1NC/AC/MIF): fastener coated with a first layer of HI-KOTE™ 1NC lubricating anticorrosion coating and a second layer of cetyl alcohol over the entire fastener; installation by medium interference fit;

configuration 2 (HK1NC/organic lub./MIF): fastener coated with a first layer of HI-KOTE™ 1NC anticorrosion lubricating coating and a second lubricating layer 30 over the entire fastener; installation by medium interference fit;

configuration 3 (HK1NC/AC/HIF): fastener coated with a HI-KOTE™ 1NC lubricating anticorrosion coating and a second layer of cetyl alcohol over the entire fastener; installation by high interference fit;

configuration 4 (HK1NC/organic lub./HIF): fastener coated with a HI-KOTE™ 1NC lubricating anticorrosion coating and a second lubricating layer 30 over the entire fastener; installation by high interference fit;

configuration 5 (OAS/HK1NC/AC/MIF): fastener comprising a first sulfuric anodization layer, a second layer of HI-KOTE™ 1NC lubricating anticorrosion coating on the threaded portion only and a third layer of cetyl alcohol over the entire fastener; installation by medium interference fit;

configuration 6 (OAS/HK1NC/organic lub./MIF): fastener comprising a first sulfuric anodization layer, a second layer of HI-KOTE™ 1NC lubricating anticorrosion coating on the threaded portion only and a third lubricating layer 30 over the entire fastener; installation by medium interference fit.

Figure 5:
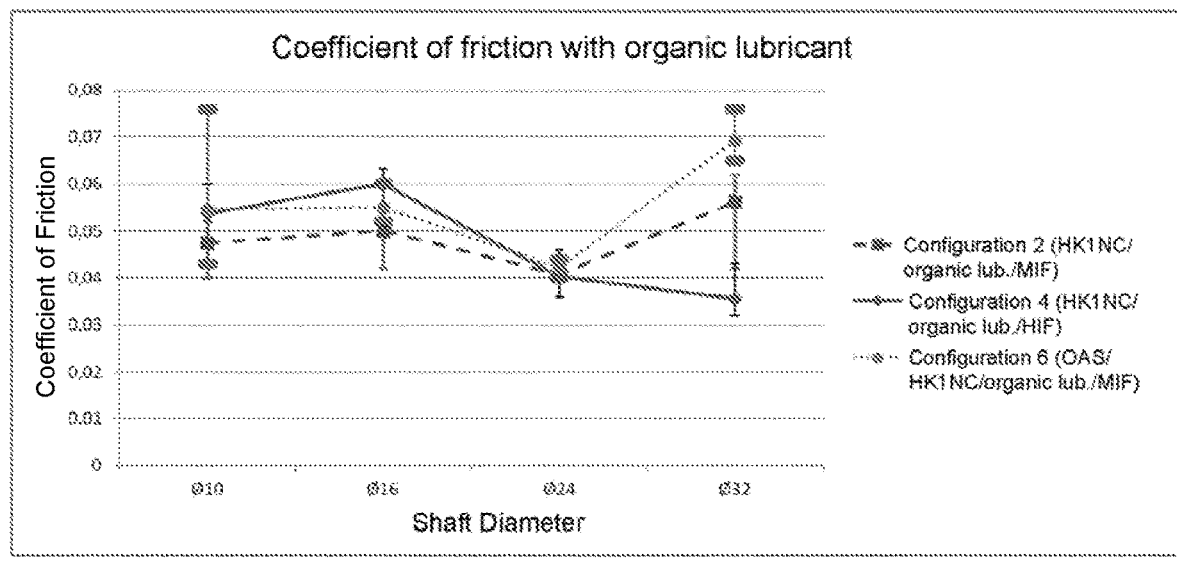
FIG. 5 shows the evolution of the friction coefficient of fasteners according to one embodiment of the invention, coated with lubricant.

FIGS. 4 and 5 show the average results of the completed tests. FIG. 4 shows the evolution of the friction coefficient of fasteners of the prior art with different diameters coated with cetyl alcohol. FIG. 5 shows the evolution of the friction coefficient of fasteners 40 according to one embodiment of the invention, which are geometrically identical to those used for the tests with cetyl alcohol and which have undergone the same treatments, but are coated with a lubricating layer 30 and not with cetyl alcohol.

The use of cetyl alcohol is clearly dependent on the substrate, as shown by the curve of configuration 5 in FIG. 4, upwardly offset relative to the curves of configurations 1 and 3, having the same substrate. The computed friction coefficients thus vary between 0.045 and 2.10 according to the diameter and the substrate.

By comparison, the use of the lubricating layer 30 shows that the friction coefficient is within a narrow range that varies between 0.035 and 0.07 regardless of the diameter and the substrate (FIG. 5).

The use of the lubricating layer 30 thus allows a fastener to be installed with a known torque or installation force in a very precise manner that is even better than that which is obtained when using cetyl alcohol. This layer 30 thus allows the risk of breakage of the fasteners during installation to be limited, since the installation torque or force, which is a function of the friction coefficient between the fastener and the structure, is only slightly dispersed.

The lubricating layer 30 is obtained, for example, from a liquid alkaline solution with a pH between 8 and 10, comprising at least one mixture of lubricating polymers dispersed in an aqueous base. In the liquid state, the composition of the solution is described in table 2.

TABLE 2

| Compound | % weight |
| --- | --- |
| Solvent: Water | 50-65 |
| Solvent: Isopropanol | 10-15 |
| Lubricating polymers | 20-35 |
| Other compounds | 0-7 |

The solvent is a mixture of water and isopropanol, for example. As it is liquid at its operating temperature, the solvent dissolves and/or dilutes the other substances without chemically modifying them and without modifying itself. The isopropanol allows quicker drying of the solution to be obtained once applied. The solvent evaporates upon drying.

The lubricating polymer is, for example, a composition comprising a polyolefin or a mixture of polyolefins, for example a mixture of polyethylene and/or polypropylene and polytetrafluoroethylene.

A polyolefin is an olefin polymer with a general structure of the following type:

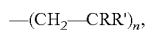

in which the radicals R and R' can be a hydrogen atom, a methyl ($-CH_3$), ethyl ($-C_2H_5$) or propyl ($-C_3H_7$) group.

The percentage by weight of polyolefin(s) in the solution is between 19.5% and 30%, for example, and the percentage by weight of the polytetrafluoroethylene in the solution is between 0.5% and 5%.

The solution can further comprise up to 4% by weight of a desiccant, for example a silica gel. The desiccant allows the drying time of the solution to be accelerated once applied.

The solution can further comprise up to 2% by weight of a surface-active agent, such as polyethylene glycol ether. It improves the dispersion of the lubricating polymers in an aqueous-based solvent. The surface-active agent evaporates upon drying.

The solution can further comprise less than 1% by weight of a biocide that prevents the rapid formation of bacteria and of fungus likely to develop in an aqueous-based solution.

The dry extract of such a solution comprises the lubricating polymers and, if it is contained in the liquid solution, the desiccant and/or the biocide will be between 20% and 40% by weight. The dry extract comprises at least 80% of lubricating polymers and at most 100%, if the solution comprises neither desiccant nor biocide.

Table 3 shows a preferred formulation of the solution.

TABLE 3

| Compound | % weight |
| --- | --- |
| Solvent: Water | 53.9 |
| Solvent: Isopropanol | 15 |
| Lubricating polymers | 26 |
| Including: PTFE | 1 |
| Other compounds | |
| Silica gel | 3.0 |
| PEG Ether alcohol | 2.0 |
| Biocide | 0.1 |

The dry extract of such a formulation comprises the lubricating polymers, the silica gel and the biocide, that is 29.1% by weight. The lubricating polymers in this example constitute 89.34% by weight of the dry extract (26% of the 29.1% of dry material).

A mode for obtaining the fastener 10 comprising a lubricating layer 30 is as follows.

In a first step, the metallic fastener 10 arriving from the forge and/or in a machined state is degreased, dried, then sandblasted, in order to provide a clean external surface suitable for the adhesion of a coating. Optionally, a deposition of aluminum in a vacuum or anodic oxidation is carried out partially or over the entire external surface of the fastener 10. If necessary, the threads of the fastener are coated with a lubricating anticorrosion coating of the HI-KOTE™ 1 NC type.

In a second step, the fastener is loaded into a basket, then soaked in an alkaline solution that comprises 60% to 80% by weight of an aqueous-based solvent and 20% to 35% by weight of a mixture of polyolefin(s) and polytetrafluoroethylene dispersed in the solvent, for one minute at most.

The basket is centrifuged so as to spin-off the excess lubricant, then dried between 60° C. and 80° C. so that the solvents evaporate.

This method allows a layer 30 with a thickness of several microns to be obtained on the external surface of the screw 10 comprising at least 80% of lubricating polymers. It is to be noted that the drying temperature is lower than the lowest melting temperature of the polyolefins. Indeed, a temperature higher than 150° C. causes yellowing and even browning of the polymer layer and contributes to a deterioration in the performance of the coating.

When the entire surface of the fastener can be coated with the lubricating layer 30, such a method is advantageous as it allows large volumes of fasteners to be treated at once.

A further mode for applying the lubricating layer 30 comprises using a spray gun to spray an alkaline solution comprising 60% to 80% by weight of an aqueous-based solvent and 20% to 35% of a mixture of polyolefin(s) and polytetrafluoroethylene over all or part of the fastener 10. In this case, the thickness of the lubricating layer 30 is controlled by the operator and the centrifugation operation is not necessary.

Such a method is mainly used when only part of the fastener has to be coated. For example, if only one portion of the shaft has to be coated, the head and part of the shaft must be masked. In this case, the fasteners are installed in perforated plates that mask the non-lubricated portion and the operator or a robot sprays the alkaline solution only on the opposite side of the head.

The method for installing the screw 10 comprising a lubricating layer 30 in a hole passing through at least two structures of an aircraft is as follows.

The length of the fastener 10 is selected according to the thickness of the structures to be assembled, such that the threaded portion 16 emerges from the structure 24 after having been inserted. The insertion of the fastener into the structure by interference fit is carried out by pushing on the head or by drawing the traction tail if the fastener comprises a traction tail or even by screwing a nut onto the threaded portion in the case of fasteners with a conical shaft. By virtue of its high lubricating power, the lubricating layer 13 allows the screw to be inserted by interference fit. However, due to this same interference fit between the external surface of the shaft of the screw and the internal surface of the structure, and due to the low adherence of the layer 30 on the shaft of the screw, the lubricating layer 30 is partly stripped from the shaft of the screw both on its height and on its periphery, leaving conductive portions of the shaft 14 bare. The removal of the layer 30 is not complete due to the manufacturing tolerances of the screw and to the mode for applying the lubricant on the screw, which very locally can form pockets for storing lubricant that are several microns thick.

The lubricating layer 30 sufficiently reduces the friction forces between the screw and the structure to allow interference fit installation. Its adherence is strong enough to adhere to the shaft and to withstand any manual manipulation and it is weak enough to be partly removed during an interference fit assembly as the installation progresses.

Once the head 12 of the screw 10 is in contact with the external surface 32 of the structure 22, which is directed towards the outside of the aircraft, and the nut is in contact with the external surface 34 of the structure 24, which is directed towards the inside of the aircraft, the fastener 10 is installed and assembles the structures 22 and 24 without clearance. When the head 12 of the screw 10 is struck by lightning, the electric current is discharged into the structural elements 22, 24 or, in the case of composite structures, towards a metallic frame that is optionally included on the surface 32 or inside the structural elements via the metallic portions of the shaft 14.

Of course, the invention is not limited to the embodiments described above. Thus, the shaft 14 of the screw can be conical and inserted into a conical hole or into a sleeve, the internal surface of which is conical and the external surface of which is cylindrical, that is installed in a cylindrical hole. A fastener comprising such a sleeve is disclosed in patent application FR 2946707 of the applicant. The enlarged head of the screw can be of any known shape, for example projecting or rounded.

Figure 6:
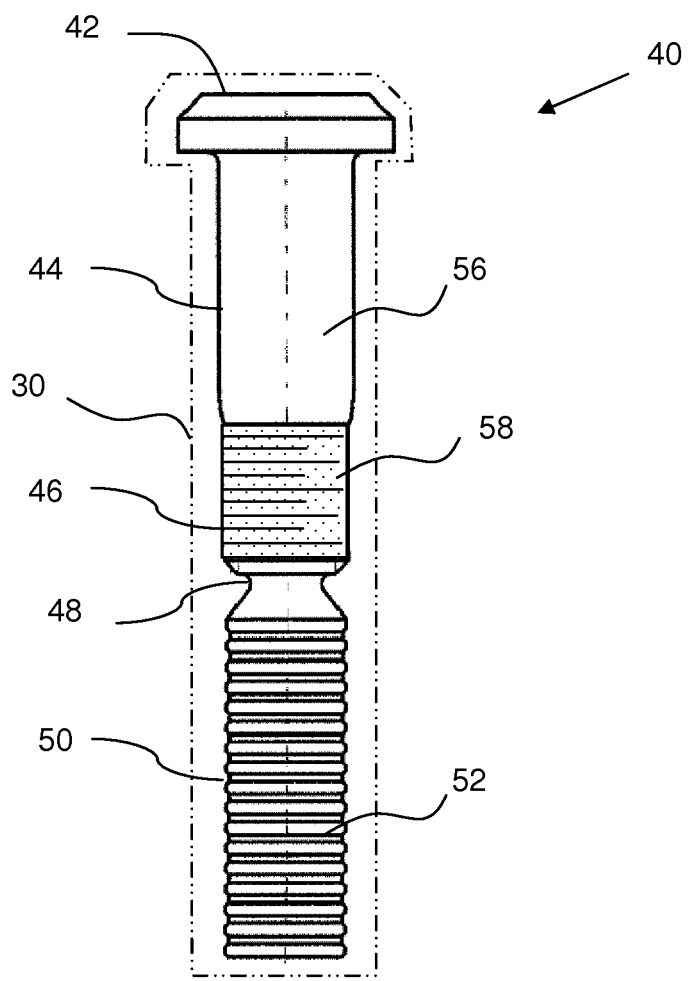
FIG. 6 shows a fastener according to a fourth embodiment of the invention.

By way of a variant, the fastener can comprise a traction tail that is provided with traction grooves and is breakable at a shear groove, as shown in FIG. 6. The fastener 40 comprises a projecting head 42, a cylindrical shaft 44, a threaded portion 46, a shear groove 48, which is designed to break under a certain tensile or bending stress, and a traction tail 50 comprising traction grooves 52.

In this embodiment, the head 42 and the shaft 44 have an external conductive surface 56 and the threaded portion has an external surface 58 that is coated with an electrically isolating HI-KOTE™ 1NC anticorrosion coating. The entire fastener is coated with a lubricating layer 30 comprising a mixture of polyolefin(s) and polytetrafluoroethylene, for example by soaking, centrifugation and drying, as previously described. Of course, only the shaft 44 could be coated with the lubricating layer 30, by means of a spray gun and of masks, on only one portion that is of annular, axial or another shape.

This fastener 40 is installed by interference fit into a hole, the thickness of which is such that the traction tail 52 emerges from the structure on the opposite side of the head 42. A tool comprising jaws grips the traction grooves and pulls the fastener 40 into the hole. The traction tail is then broken at the shear groove 50 by an additional traction force or by bending the traction tail.

By way of a variant of all of the types of fastener described above, the threaded blocking portion can be replaced by swaging grooves intended to receive a swage collar instead of a screw nut.

The invention claimed is:

1. A method for installing a metallic fastener a hole passing through at least two structural elements, the fastener comprising an enlarged head and a shaft having an external diameter $D_1$ before installation that is greater than an internal diameter $D_3$ of the hole, said shaft comprising a conductive surface,
wherein at least the conductive surface includes a coating with a lubricating layer comprising a mixture of at least one polyolefin and one polytetrafluoroethylene, and wherein during the installation, inserting the fastener into the hole wherein the lubricating layer has a composition determined so as to have sufficient adherence to prevent its abrasion by manual manipulation of the fastener and to be weak enough to be at least partly stripped from the conductive surface during the interference fit insertion of the fastener and comprises at least 80% by weight of polyolefin and polytetrafluoroethylene, and during a step of inserting the shaft of the fastener into the structure through an interference fit, the lubricating layer is partly stripped from the shaft of the screw.

2. The method according to claim 1, wherein inserting the fastener includes inserting the fastener wherein the lubricating layer is, before installation, between 8.3 μm and 23.5 μm thick.

3. The method according to claim 1, wherein inserting the fastener includes inserting the fastener wherein the lubricating layer is, after installation, between 0.9 μm and 2.1 μm thick.

4. The method according to claim 1, wherein inserting the fastener includes inserting the fastener wherein the conductive surface comprises a sulfuric anodization layer that is less than 1 μm thick.

5. The method according to claim 1, wherein inserting the fastener includes inserting the fastener wherein the conductive surface is a metal having undergone a passivation operation.

6. The method according to claim 1, wherein inserting the fastener includes inserting the fastener wherein the conductive surface is an aluminum layer deposited in a vacuum.

7. The method according to claim 1, wherein inserting the fastener includes inserting the fastener wherein the conductive surface comprises the entire external surface of the shaft.

8. The method according to claim 1, wherein inserting the fastener includes inserting the fastener wherein the lubricating layer further coats a threaded portion of the fastener.

9. The method according to claim 1, wherein inserting the fastener includes inserting the fastener wherein the fastener further comprises a traction tail and a shear groove designed to break under a certain tensile stress.

10. The method according to claim 1, wherein inserting the fastener includes inserting the fastener wherein the conductive surface comprises only one portion of the external surface of the shaft.

11. The method according to claim 10, wherein inserting the fastener includes inserting the fastener wherein the conductive surface comprises an annular portion of the shaft of the fastener.

12. The method according to claim 10, wherein inserting the fastener includes inserting the fastener wherein the conductive surface comprises an axial portion of the shaft of the fastener.

\* \* \* \* \*